(12) United States Patent
Tong et al.

(10) Patent No.: US 12,149,472 B2
(45) Date of Patent: *Nov. 19, 2024

(54) METHOD OF SCRAMBLING REFERENCE SIGNALS, DEVICE AND USER EQUIPMENT USING THE METHOD

(71) Applicant: Sun Patent Trust, New York, NY (US)

(72) Inventors: Hui Tong, Beijing (CN); Masayuki Hoshino, Kanagawa (JP); Ming Xu, Beijing (CN); Daichi Imamura, Saitama (JP)

(73) Assignee: Sun Patent Trust, New York, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/063,002

(22) Filed: Dec. 7, 2022

(65) Prior Publication Data

US 2023/0096976 A1    Mar. 30, 2023

Related U.S. Application Data

(63) Continuation of application No. 16/906,897, filed on Jun. 19, 2020, which is a continuation of application
(Continued)

(51) Int. Cl.
  *H04B 17/30* (2015.01)
  *H04B 7/04* (2017.01)
(Continued)

(52) U.S. Cl.
  CPC .......... *H04L 5/0048* (2013.01); *H04L 5/0025* (2013.01); *H04L 5/0053* (2013.01);
(Continued)

(58) Field of Classification Search
  None
  See application file for complete search history.

(56) References Cited

U.S. PATENT DOCUMENTS 8,422,355 B2    4/2013    Kishiyama et al.
8,446,886 B2    5/2013    Hu et al.
(Continued)

FOREIGN PATENT DOCUMENTS

CN        1599279 A      3/2005
JP    2008-294862 A     12/2008
(Continued)

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
(Continued)

*Primary Examiner* — Sai Aung
(74) *Attorney, Agent, or Firm* — Seed IP Law Group LLP

(57) ABSTRACT

A Method of scrambling reference signals, device and user equipment using the method are provided. In the method, a plurality of layers of reference signals assigned on predetermined radio resource of a plurality of layers of resource blocks with the same time and frequency resources are scrambled, the method comprising: an orthogonalizing step of multiplying each layer of reference signal selectively by one of a plurality of orthogonal cover codes (OCCs) with the same length wherein the OCC multiplied to a first layer of reference signal can be configured as different from those multiplied to other layers of reference signals; and a scrambling step of multiplying all of symbols obtained from the OCC multiplied to each of the other layers of reference signals by a symbol-common scrambling sequence wherein the symbol-common scrambling sequences can be different from each other for reference signals multiplied by the same OCC.

18 Claims, 10 Drawing Sheets

Related U.S. Application Data

No. 16/022,361, filed on Jun. 28, 2018, now Pat. No. 10,727,997, which is a continuation of application No. 15/600,419, filed on May 19, 2017, now Pat. No. 10,038,534, which is a continuation of application No. 14/368,767, filed as application No. PCT/CN2012/070604 on Jan. 19, 2012, now Pat. No. 9,712,299.

(51) Int. Cl.
| | | |
|---|---|---|
| *H04L 5/00* | (2006.01) | |
| *H04L 27/26* | (2006.01) | |
| *H04B 7/024* | (2017.01) | |
| *H04B 7/06* | (2006.01) | |
| *H04J 11/00* | (2006.01) | |
| *H04L 25/02* | (2006.01) | |

(52) U.S. Cl.
CPC .......... *H04L 27/2613* (2013.01); *H04B 7/024* (2013.01); *H04B 7/0684* (2013.01); *H04J 11/005* (2013.01); *H04L 5/0035* (2013.01); *H04L 5/0057* (2013.01); *H04L 5/0073* (2013.01); *H04L 25/0224* (2013.01)

(56) References Cited

U.S. PATENT DOCUMENTS

| | | | |
|---|---|---|---|
| 8,797,993 | B2 | 8/2014 | Tong et al. |
| 2002/0044591 | A1 | 4/2002 | Lee et al. |
| 2008/0165969 | A1 | 7/2008 | Khandekar et al. |
| 2008/0247477 | A1 | 10/2008 | Shen et al. |
| 2010/0034076 | A1 | 2/2010 | Kishiyama et al. |
| 2010/0172235 | A1 | 7/2010 | Liu et al. |
| 2010/0177688 | A1 | 7/2010 | Kishiyama et al. |
| 2011/0176634 | A1 | 7/2011 | Yoon et al. |
| 2011/0317596 | A1 | 12/2011 | Jöngren et al. |
| 2012/0127952 | A1 | 5/2012 | Tong et al. |
| 2012/0176939 | A1* | 7/2012 | Qu ........................ H04L 5/0048 370/255 |
| 2012/0207199 | A1* | 8/2012 | Guo ...................... H04L 1/0027 375/308 |
| 2012/0243500 | A1 | 9/2012 | Chandrasekhar et al. |
| 2012/0257553 | A1 | 10/2012 | Noh et al. |
| 2012/0315859 | A1* | 12/2012 | Lee ........................ H04W 24/08 455/67.13 |
| 2013/0070719 | A1 | 3/2013 | Xu et al. |
| 2013/0094384 | A1* | 4/2013 | Park ...................... H04L 1/0026 370/252 |
| 2013/0279362 | A1* | 10/2013 | Park ......................... H04L 5/00 370/252 |
| 2014/0219115 | A1 | 8/2014 | Etemad et al. |
| 2014/0355408 | A1* | 12/2014 | Tong ..................... H04L 5/0025 370/208 |
| 2014/0362956 | A1* | 12/2014 | Zhang ................... H04L 1/0045 375/346 |
| 2015/0131536 | A1* | 5/2015 | Kaur ..................... H04L 5/0055 370/329 |
| 2015/0131749 | A1 | 5/2015 | Slomina et al. |
| 2018/0309558 | A1 | 10/2018 | Tong et al. |

FOREIGN PATENT DOCUMENTS

| | | |
|---|---|---|
| JP | 2012-530420 A | 11/2012 |
| JP | 2013-533670 A | 8/2013 |
| WO | 2010/145276 A1 | 12/2010 |
| WO | 2011/116651 A1 | 9/2011 |
| WO | 2011/150784 A1 | 12/2011 |

OTHER PUBLICATIONS

CATT, "Considerations on Reference Signal for Interference Measurement," R1-113733, 3GPP TSG RAN WG1 Meeting #67, Agenda Item: 7.5.2.2, San Francisco, USA, Nov. 14-18, 2011, 5 pages.
International Search Report dated Nov. 15, 2012, for corresponding International Application No. PCT/CN2012/070604, 3 pages.
Motorola Mobility, "Interference Measurements based on CSI-RS," R1-114023, Agenda Item: 7.5.2.2, 3GPP TSG RAN1 Meeting #67, San Francisco USA, Nov. 14-18, 2011, 4 pages.

* cited by examiner

| macro node | LPN1 | LPN2 | LPN3 |
|---|---|---|---|
| S1*Q1    S2*Q1 | S1*Q1    -S2*Q1 | S1*Q1    S2*Q1 | S1*Q1    -S2*Q1 |
| S3*Q1    S4*Q1 | S3*Q1    -S4*Q1 | -S3*Q1    -S4*Q1 | -S3*Q1 / S4*Q1 |

| | LPN4 | LPN5 | LPN6 |
|---|---|---|---|
| | S1*Q2    -S2*Q2 | S1*Q2    S2*Q2 | S1*Q2    -S2*Q2 |
| | S3*Q2    -S4*Q2 | -S3*Q2    -S4*Q2 | -S3*Q2 / S4*Q2 |

Fig. 12

METHOD OF SCRAMBLING REFERENCE SIGNALS, DEVICE AND USER EQUIPMENT USING THE METHOD

BACKGROUND

Technical Field

The present disclosure relates to the field of signals multiplexing method and reference signal design in communication system.

Description of the Related Art

The cooperation between base stations is an important means to mitigate inter-cell-interference in cellular systems and is being intensively discussed in the fourth generation of wireless communication system standardizations. It is important for the specifications to enable flexible CoMP (Coordinate Multiple Points) operations, such as JT (joint transmission), coordinated beamforming, and dynamic point selection, etc.

It is noted that different CoMP operations require different CQI (Channel Quality Indicator) calculation assumptions. For example, for JT transmission, a UE (user equipment) would assume the signal power is from multiple cells (transmission points) that transmit PDSCHs (Physical Downlink Shared Channels) to the UE, while other cells are interfering cells. But, for CB (coordinated beamforming) transmission, the UE would assume the signal power is from only one cell, while other cells are interfering cells. In general, the signal power can be measured based on CSI-RSs (Channel Status Information Reference Signals) from corresponding cells, which is similar to current techniques (3GPP (3$^{rd}$ Generation Partnership Project) Rel-8/Rel-10). However, the current technique on interference measurement does not work well, because it can measure only the overall interference power (interference from all cells except the serving cell). In general, in Rel-11 and after, it would preferred to be able to measure interference from each TP (transmission point) to better cope with flexible CoMP operations. Therefore, a new interference measurement mechanism is required for base station cooperation.

One method to enable per-TP interference measurement is to have each TP to transmit its own reference signal for the purpose of interference measurement. Those reference signals may be overlapped in time and frequency domain to enable easy spatial reuse of the time-frequency resources. To reduce the effort in standardization, it would be an attractive choice to reuse the CSI-RS configuration in Rel-8/Rel-10.

Reusing the CSI-RS configuration includes two folds of meanings: the first is to reuse the CSI-RS time and frequency positions, and the second is to reuse the CSI-RS OCCs (Orthogonal Cover Codes) and scrambling sequences. To avoid potential impact to legacy UEs, it is strongly preferred to reuse the CSI-RS time and frequency positions. However, reusing OCCs and scrambling sequences have some drawback in heterogeneous networks, therefore a new OCC and scrambling may be further investigated. It is noted that the revised OCC and scrambling does not reduce legacy UE performance.

The RS (Reference Signal) reusing CSI-RS time and frequency positions for interference measurement purposes may be called IM-RS (Interference Measurement Reference Signal). FIG. 1 shows an example of IM-RS configurations from different TPs. In FIG. 1, IM-RSs from three different TPs, i.e., TP1, TP2 and TP3, are transmitted on the same time and frequency positions (indicated by boxes filled in black in FIG. 1) by different descrambling. That is, different TPs transmit one port IM-RSs based on the same IM-RS configuration (time and frequency positions) but scrambled differently. The UE calculates respective interference powers after descrambling.

The problem of the previous OCC and scrambling in a heterogeneous network is as follows. In a heterogeneous network, a UE may be associated with a TP that has relatively lower receiving power for traffic offloading purposes. More specifically, a UE may be associated with a LPN (Low Power Node) while the receiving power from a macro node is much higher than the power from the LPN. In this case, when the UE intends to estimate the interference power from another LPN via descrambling the related port, the residual interference from the macro node may be much higher than the interference power from the another LPN, which implies very inaccurate interference power estimation of the another LPN. The impact is more severe for subband CQI calculations because of shorter scrambling sequences.

Now, detailed analysis of an exemplary heterogeneous network is given with reference to FIG. 2 and FIG. 3. FIG. 2 shows an example of a heterogeneous deployment, and FIG. 3 shows an example of IM-RS scrambling configuration for the case of FIG. 2. In FIG. 2, the UE desires to receive data from LPN1 functioning as the serving transmission point while LPN2, LPN3 and macro node are considered as interfering transmission points. For example, the macro node has a transmitter power of 46 dBm which is much higher than those of LPN1, LPN2 and LPN3. As shown in FIG. 3, IM-RSs for LPN1, LPN2, LPN3 and macro node are configured based on the previous OCC and scrambling such as in Rel-10. Specifically, four layers of IM-RSs are multiplexed on the same time and frequency resources by two length-2 OCCs [1, 1], [1, −1] and two sets of scrambling sequences [S1, S2], [S3, S4]. That is, the macro node and LPN2 are assigned with the OCC [1, 1] while LPN1 and LPN3 are assigned with the OCC [1, −1]. The sequences S1, S2 are respectively multiplied to the two symbols of the OCCs for both the macro node and LPN1 while the sequences S3, S4 which are different from the sequences S1, S2 are respectively multiplied to the two symbols of the OCCs for both LPN2 and LPN3. Here, the sequences S1 and S2 are independent from each other and so do the sequence S3 and S4. In such a case, the CQI calculation at UE needs to know the interference from each of the interfering transmission points LPN2, LPN3 and macro node. Taking LPN2 as an example, the measured interference from LPN2 is calculated as follows by the equation (1).

$$\hat{P}_{LPN2} = P_{LPN2} + \frac{s_3^* s_1 + s_4^* s_2}{2} \cdot P_{macro} + \quad (1)$$

$$\ldots \frac{s_3^* s_3 - s_4^* s_4}{2} \cdot P_{LPN3} + \frac{s_3^* s_1 - s_4^* s_2}{2} \cdot P_{LPN1}$$

where $P_{LPN1}$ denotes the power the UE receives from LPN1 and the symbol "*" indicates conjugate.

$$\frac{s_3^* s_3 - s_4^* s_4}{2}$$

in the equation (1) is zero, but $$\frac{s_3^* s_1 - s_4^* s_2}{2} \text{ and } \frac{s_3^* s_1 + s_4^* s_2}{2}$$

are non-zero. Thus, the interference from LPN3 is removed well but those from LPN1 and macro node are remained to impact the measured interference from LPN2. Especially, since $P_{macro}$ is much higher than $P_{LPN2}$, the interference estimation for LPN2 is very inaccurate.

Therefore, how to accurately estimate the interference power from one or multiple transmission points which may or may not have the strongest receiving power is required to be solved.

BRIEF SUMMARY

In one aspect of the present disclosure, there is provided a method of scrambling a plurality of layers of reference signals assigned on predetermined radio resource of a plurality of layers of resource blocks with the same time and frequency resources, comprising: an orthogonalizing step of multiplying each layer of reference signal selectively by one of a plurality of orthogonal cover codes (OCCs) with the same length, wherein the OCC multiplied to a first layer of reference signal can be configured as different from those multiplied to other layers of reference signals; and a scrambling step of multiplying all of symbols obtained from the OCC multiplied to each of the other layers of reference signals by a symbol-common scrambling sequence, wherein the symbol-common scrambling sequences can be different from each other for reference signals multiplied by the same OCC.

In another aspect of the present disclosure, there is provided a device of scrambling a plurality of layers of reference signals assigned on predetermined radio resource of a plurality of layers of resource blocks with the same time and frequency resources, comprising: an orthogonalizing unit for multiplying each layer of reference signal selectively by one of a plurality of orthogonal cover codes (OCCs) with the same length, wherein the OCC multiplied to a first layer of reference signal can be configured as different from those multiplied to other layers of reference signals; and a scrambling unit for multiplying all of symbols obtained from the OCC multiplied to each of the other layers of reference signals by a symbol-common scrambling sequence, wherein the symbol-common scrambling sequences can be different from each other for reference signals multiplied by the same OCC.

In a further aspect of the present disclosure, there is provided a user equipment for receiving from a plurality of transmission points a plurality of layers of reference signals assigned on predetermined radio resources of a plurality of layers of resource blocks with the same time and frequency resources, comprising: a transceiver unit for receiving the plurality of layers of resource blocks from the plurality of transmission points; and a demodulation unit for detecting the plurality of layers of resource blocks in time domain and/or frequency domain to obtain the plurality of layers of reference signals, wherein, the plurality of layers of reference signals having been subject to the following processes at the plurality of transmission points side: each layer of reference signal being multiplied selectively by one of a plurality of orthogonal cover codes (OCCs) with the same length wherein the OCC multiplied to a first layer of reference signal can be configured as different from those multiplied to other layers of reference signals, and all of symbols obtained from the OCC multiplied to each of the other layers of reference signals being multiplied by a symbol-common scrambling sequence wherein the symbol-common scrambling sequences can be different from each other for reference signals multiplied by the same OCC.

In a further aspect of the present disclosure, there is provided a method of scrambling a plurality of layers of reference signals assigned on predetermined radio resource of a plurality of layers of resource blocks with the same time and frequency resources, wherein the plurality of layers of reference signals being grouped into a first set and a second set, the method comprising: an orthogonalizing step of multiplying each layer of reference signal selectively by one of a plurality of orthogonal cover codes (OCCs) with the same length, wherein the OCCs multiplied to the first set can be configured as different from those multiplied to the second set; and a scrambling step of multiplying all of symbols obtained from the OCC multiplied to each layer of reference signal by a symbol-common scrambling sequence, wherein the symbol-common scrambling sequences can be different from each other for reference signals multiplied by the same OCC.

In a further aspect of the present disclosure, there is provided a device of scrambling a plurality of layers of reference signals assigned on predetermined radio resource of a plurality of layers of resource blocks with the same time and frequency resources, wherein the plurality of layers of reference signals being grouped into a first set and a second set, the device comprising: an orthogonalizing unit for multiplying each layer of reference signal selectively by one of a plurality of orthogonal cover codes (OCCs) with the same length, wherein the OCCs multiplied to the first set can be configured as different from those multiplied to the second set; and a scrambling unit for multiplying all of symbols of obtained from the OCC multiplied to each layer of reference signal by a symbol-common scrambling sequence, wherein the symbol-common scrambling sequences can be different from each other for reference signals multiplied by the same OCC.

In a further aspect of the present disclosure, there is provided a user equipment for receiving from a plurality of transmission points a plurality of layers of reference signals assigned on predetermined radio resources of a plurality of layers of resource blocks with the same time and frequency resources, wherein the plurality of layers of reference signals being grouped into a first set and a second set, the user equipment comprising: a transceiver unit for receiving the plurality of layers of resource blocks from the plurality of transmission points; and a demodulation unit for detecting the plurality of layers of resource blocks in time domain and/or frequency domain to obtain the plurality of layers of reference signals, wherein, the plurality of layers of reference signals having been subject to the following processes at the plurality of transmission points side: each layer of reference signal being multiplied selectively by one of a plurality of orthogonal cover codes (OCCs) with the same length wherein the OCCs multiplied to the first set of layers of reference signals can be configured as different from those multiplied to the second set, all of symbols obtained from the OCC multiplied to each layer of reference signal being multiplied by a symbol-common scrambling sequence wherein the symbol-common scrambling sequences can be different from each other for reference signals multiplied by the same OCC.

In the present disclosure, by the configuration of OCC and scrambling on IM-RSs, IM-RSs from multiple LPNs can be kept fully orthogonal with IM-RS from a macro node and quasi-orthogonal with each other, so that, when detecting the interference from a LPN, the interference from a macro node can be eliminated thoroughly while the interference from other LPNs can be effectively reduced.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 12 shows an example of scrambling configuration for IM-RSs from different TPs according to a third embodiment of the present disclosure;

FIG. 13 is a diagram showing a flow chart of a method of scrambling reference signals according to a fifth embodiment of the present disclosure; and.

DETAILED DESCRIPTION

Figure 1:
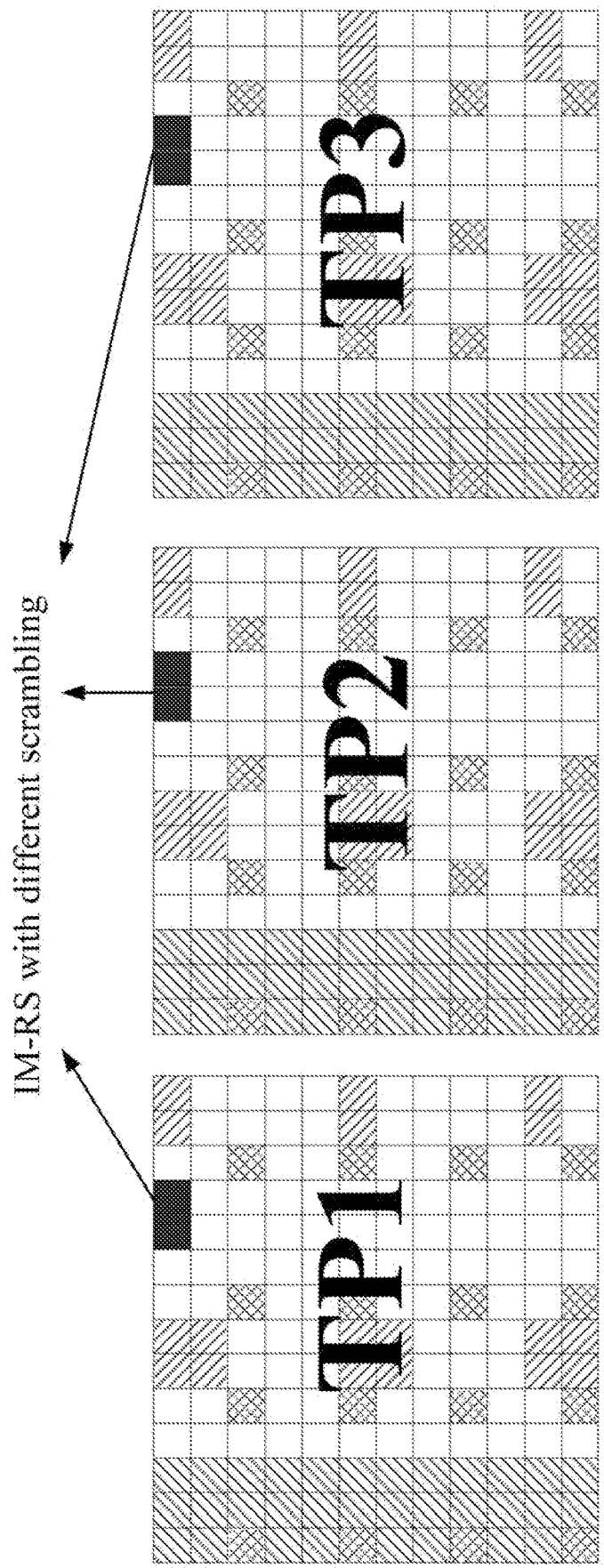
FIG. 1 shows an example of IM-RS configurations from different TPs.

In the following detailed description, reference is made to the accompanying drawings, which form a part hereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Figure 2:
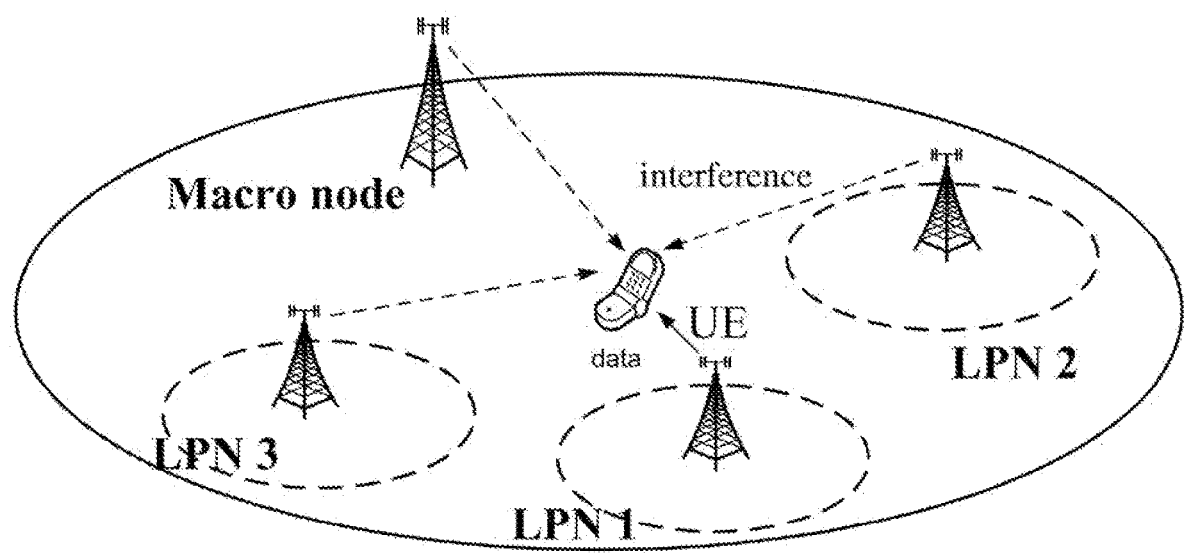
FIG. 2 shows an example of a heterogeneous deployment.
Figure 3:
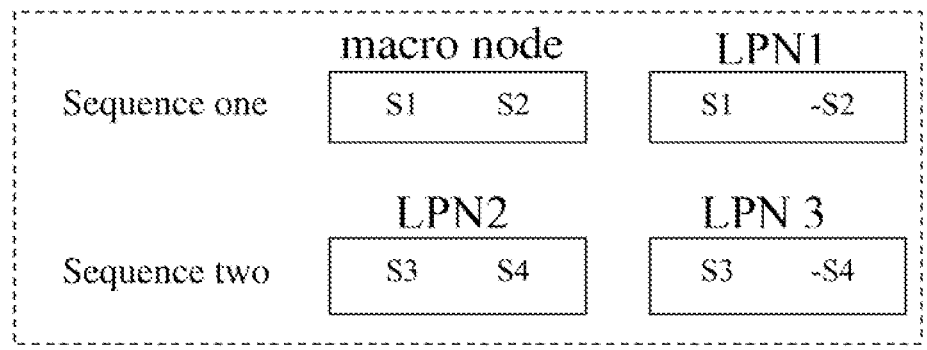
FIG. 3 shows an example of IM-RS scrambling configuration for the case of FIG. 2.

Based on the detailed analysis with reference to FIGS. 2 and 3, it is noted from the equation (1) that the interference from LPN3 is eliminated thoroughly because LPN2 and LPN3 are fully orthogonal with each other by the orthogonality of OCCs. Also, in the configuration in FIG. 3, the macro node and LPN1 are orthogonalized by OCCs, which means that when detecting the interference from LPN1, the residual power of the macro interference can be eliminated very well because of full orthogonality between them. Specifically, the measured interference from LPN1 is calculated as follows by the equation (2).

$$\hat{P}_{LPN1} = P_{LPN1} + \frac{s_1^* s_1 - s_2^* s_2}{2} \cdot P_{macro} + \quad (2)$$
$$\ldots \frac{s_1^* s_3 - s_2^* s_4}{2} \cdot P_{LPN2} + \frac{s_1^* s_3 + s_2^* s_4}{2} \cdot P_{LPN3}$$

where $P_{LPN1}$ denotes the power the UE receives from LPN1 and the symbol "*" indicates conjugate.

$$\frac{s_1^* s_1 - s_2^* s_2}{2}$$

in the equation (2) is zero, but $$\frac{s_1^* s_3 - s_2^* s_4}{2} \text{ and } \frac{s_1^* s_3 + s_2^* s_4}{2}$$

are non-zero. Thus, the interference from the macro node is removed well. Therefore, if a macro node and a LPN are CDMed (Code Division Multiplexed), it does not need to worry about the macro interference after descrambling.

Accordingly, if all of LPN ports are orthogonal to macro ports, then LPN interference can be detected with high accuracy. However, current CSI-RS OCC and scrambling design, such as in Rel-10, allows only one LPN port to be orthogonal to the macro port. For example, in FIG. 2, only LPN1 port is orthogonal to the macro port. The feature of the current scrambling is that it is common for OCCs but specific to OFDM (Orthogonal Frequency Division Multiplexing) symbol, thus the current scrambling sequence may be called a symbol-specific scrambling sequence. For example, in FIG. 3, taking the macro node and LPN1 as an example, although they are assigned with different OCCs [1, 1], [1, −1] respectively, they are multiplied with same symbol-specific scrambling sequences S1, S2. Meanwhile, for each of the macro node and LPN1, different OFDM symbols are multiplied by different symbol-specific scrambling sequences, that is, the first symbol of OCC is multiplied with the symbol-specific scrambling sequence S1 while the second symbol of OCC is multiplied with the symbol-specific scrambling sequence S2 which is independent from S1.

Figure 4:
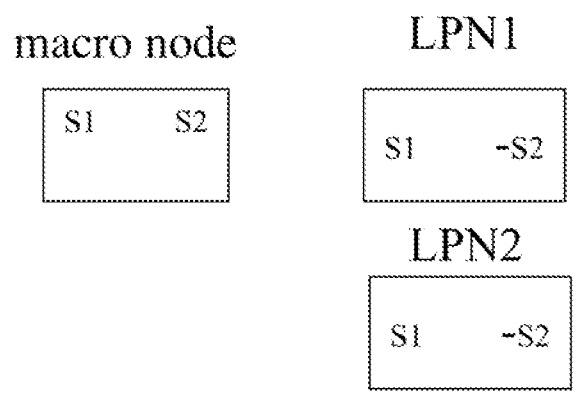
FIG. 4 shows an example of scrambling configuration for IM-RSs from different TPs.

A solution to enable multiple LPN ports to be orthogonal to a macro port is to use the scrambling configuration as shown in FIG. 4. FIG. 4 shows an example of scrambling configuration for IM-RSs from different TPs. For the purpose of simplification, only two LPNs, i.e., LPN1 and LPN2, are shown in FIG. 4. As compared with FIG. 3, the configuration for the macro node and LPN1 is not changed, that is, the macro port and LPN1 port are fully orthogonal with each other. Different from FIG. 3, the LPN2 port in FIG. 4 are configured in the same way with the LPN1 port. Thus, LPN2 port is also fully orthogonal with the macro port.

However, the configuration in FIG. 4 causes severe interference among LPN ports due to the same OCCs and scrambling configuration. Thus, how to reduce the interference among LPN ports while keeping the orthogonality between all of LPN ports and the macro port is needed to be considered.

First Embodiment

Figure 5:
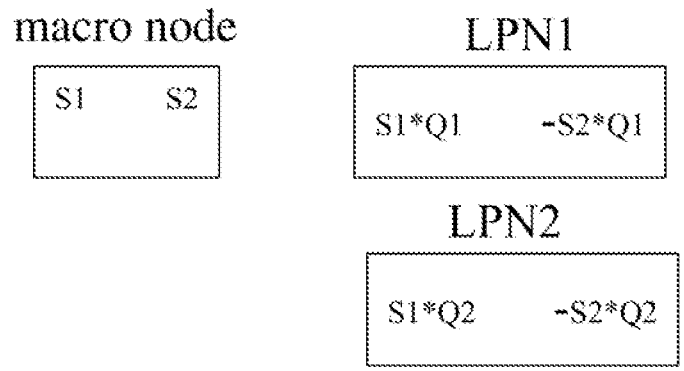
FIG. 5 shows an example of scrambling configuration for IM-RSs from different TPs according to a first embodiment of the present disclosure.

To reduce the interference among LPN ports, it is proposed to apply an additional scrambling sequence on each LPN port on the basis of the scrambling configuration for IM-RSs in FIG. 4. The additional scrambling sequence may be different for different LPNs to reduce the interference. Moreover, the additional scrambling sequence has to be common across the two symbols of OCC to maintain the orthogonality with the macro port, thus the additional scrambling sequence is called as symbol-common scrambling sequence hereinafter. FIG. 5 shows an example of scrambling configuration for IM-RSs from different TPs according to the first embodiment of the present disclosure. As compared with FIG. 4, the OCC and scrambling for the macro node is unchanged, that is, a single scrambling is performed on the macro node. On the other hand, for LPNs, on the basis of OCC and scrambling configuration in FIG. 4, a symbol-common scrambling sequence is further applied to each of LPNs, that is, a double scrambling is performed on each LPN. Specifically, as shown in FIG. 5, a symbol-common scrambling sequence Q1 is multiplied to two symbols of OOC for LPN1 while another symbol-common scrambling sequence Q2 is multiplied to two symbols of OOC for LPN2.

To sum up, IM-RS configuration includes the following steps:

Firstly, all of LPNs are assigned with a same length-2 OCC which is different from the OCC assigned to a macro node so as to make the macro node and all of LPNs fully orthogonal. Secondly, for each of the macro node and LPNs, the first and the second symbols of OCC are respectively multiplied by different symbol-specific scrambling sequences which may be common to all of the macro node and LPNs. Finally, for each of LPNs, a symbol-common scrambling sequence is multiplied to both the first and the second symbols of OCC, wherein the symbol-common scrambling sequence may be different from LPN to LPN.

Figure 6:
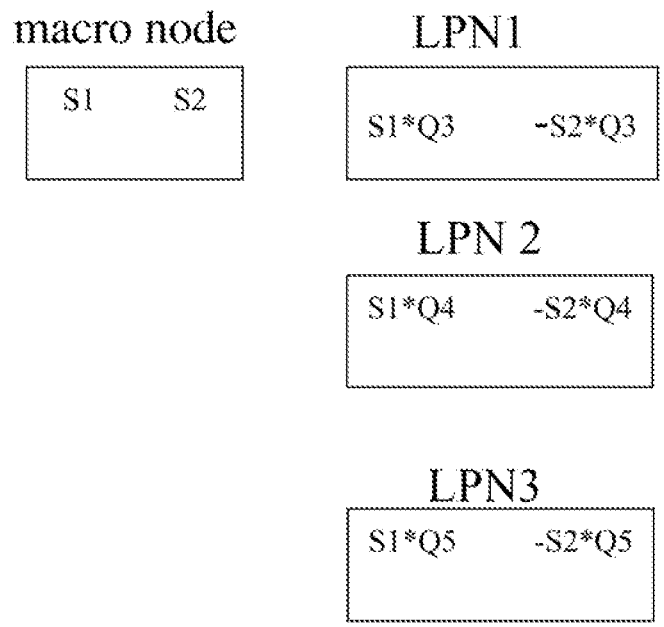
FIG. 6 shows another example of scrambling configuration for IM-RSs from different TPs according to the first embodiment of the present disclosure.

FIG. 6 shows another example of scrambling configuration for IM-RSs from different TPs according to the first embodiment of the present disclosure. FIG. 6 is to apply the concept in FIG. 5 to the exemplary heterogeneous network as shown in FIG. 2, that is, the single scrambling is applied to the macro node while the double scrambling is applied to LPN1, LPN2 and LPN3. Specifically, the macro node is assigned with the OOC [1,1] while LPN1, LPN2 and LPN3 are assigned with the same OCC [1, −1]. For each of the macro node and three LPNs, two different symbol-specific scrambling sequences S1, S2 are respectively multiplied to the first symbol and the second symbol of OCC. Both the first and the second symbols of OCC for each of the three LPNs are multiplied with a symbol-common scrambling sequence. The symbol-common scrambling sequence is Q3, Q4 or Q5 respectively for LPN1, LPN2 or LPN3. Based on the IM-RS configuration in FIG. 6, measured interference from each of the macro node and the three LPNs can be calculated by the following equations.

$$\hat{P}_{LPN1} = P_{LPN1} + 0 \cdot P_{macro} + q^*_3 q_4 \cdot P_{LPN2} + q^*_3 q_5 \cdot P_{LPN3} \quad (3)$$

$$\hat{P}_{LPN2} = P_{LPN2} + 0 \cdot P_{macro} + q^*_4 q_3 \cdot P_{LPN1} + q^*_4 q_5 \cdot P_{LPN3} \quad (4)$$

$$\hat{P}_{LPN3} = P_{LPN3} + 0 \cdot P_{macro} + q^*_5 q_3 \cdot P_{LPN1} + q^*_5 q_4 \cdot P_{LPN2} \quad (5)$$

$$\hat{P}_{macro} = P_{macro} + 0 \cdot P_{LPN1} + 0 \cdot P_{LPN2} + 0 \cdot P_{LPN3} + \ldots \text{ noisefactors} \quad (6)$$

From the above equations (3)-(6), since all of LPN ports are fully orthogonal to the macro port, the interference from the macro node can be removed well in the equations (3)-(5). Although the interference from other LPNs is remained in the equation (3)-(5) since the three LPNs are quasi-orthogonal with each other by the symbol-common scrambling sequences, the interference from other LPNs is relatively small so as not to impact LPN interference estimation very much. Furthermore, for the estimation of the interference from the macro node, interference from LPNs are all removed thoroughly as shown in the equation (6).

Figure 7:
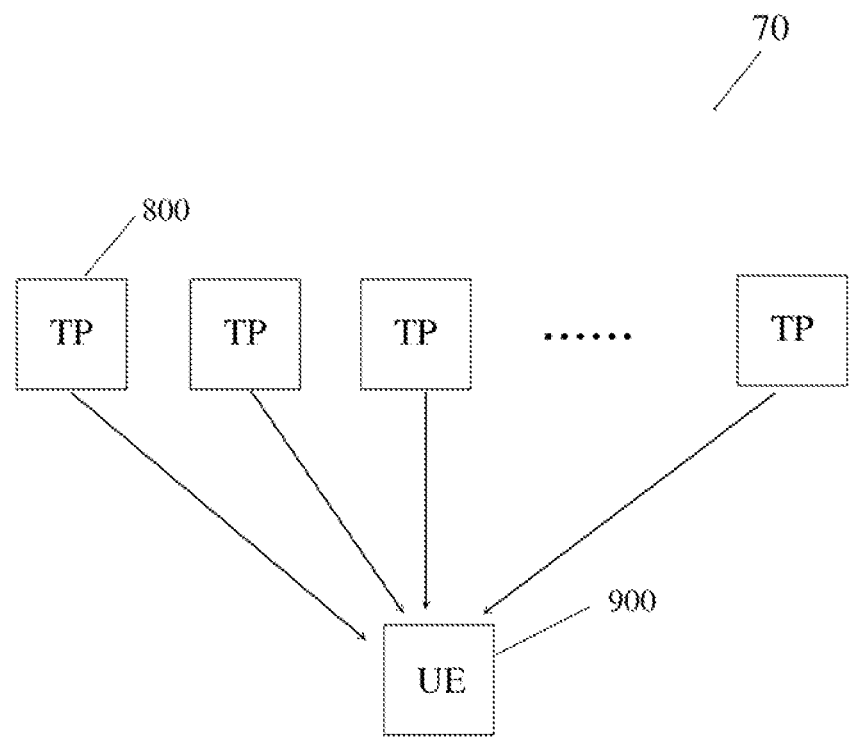
FIG. 7 shows an exemplary communication system according to the first embodiment of the present disclosure.

FIG. 7 shows an exemplary communication system 70 according to the first embodiment of the present disclosure. As shown in FIG. 7, the communication system 70 includes multiple TPs such as TP 800 and a UE 900. In the communication system 70, UE 900 may communicate with the multiple TPs such as TP 800. The multiple TPs includes a macro node and multiple LPNs. The TP 800 may be a macro node or a LPN. For the purpose of CQI calculation at UE 900, all of TPs transmit IM-RSs configured as described above to UE 900. In the following, the detailed configuration of TP 800 and UE 900 will be described with reference to FIGS. 8 and 9.

Figure 8:
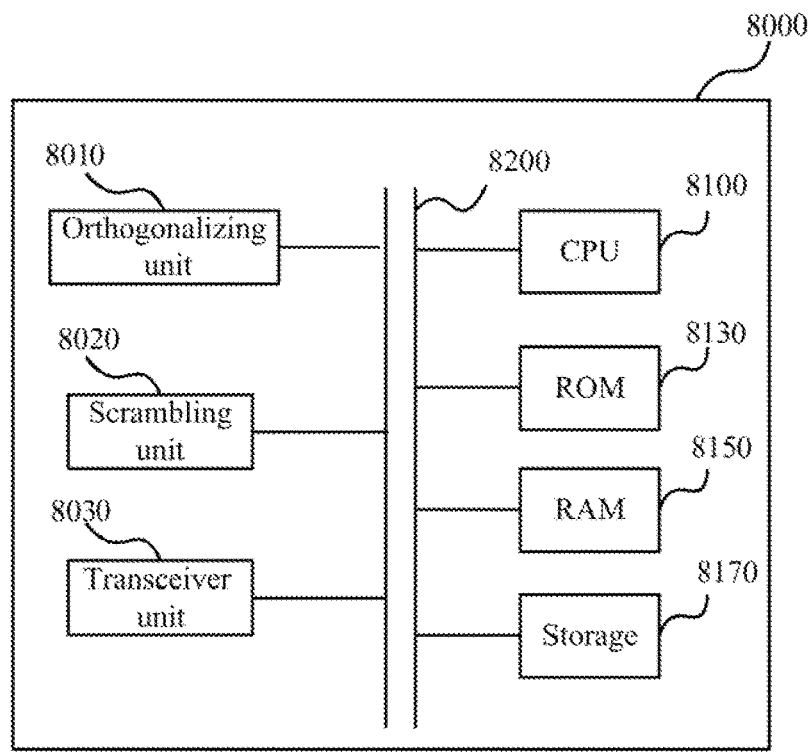
FIG. 8 is a block diagram showing a transmission point device according to the first embodiment of the present disclosure.

FIG. 8 is a block diagram showing a device 8000 according to the first embodiment of the present disclosure.

The device 8000 according to the first embodiment of the present disclosure may be configured in the transmission point 800 for communicating with at least one UE (user equipment) such as UE 900 in a communication system. The device 8000 is capable of scrambling multiple layers of RS signals assigned on predetermined locations (radio resource, which means the time and/or frequency resource such as sub-carrier, sub-frame, etc.) of a plurality of layers of resource blocks with the same time and frequency resources. As shown in FIG. 8, the device 8000 includes: an orthogonalizing unit 8010 which multiplies each layer of RS signal selectively by one of a first and a second length-2 orthogonal cover codes (OCCs) wherein the first OCC is multiplied to the layer of RS signal transmitted from a macro node while the second OCC is multiplied to layers of RS signals transmitted from LPNs; a scrambling unit 8020 which multiplies the two symbols of the OCC multiplied to each layer of RS signal respectively by different symbol-specific sequences which are common to all layers of RS signals from all of transmission points, and multiplies the two symbols of the OCC multiplied to each of layers of RS signals transmitted from LPNs by a symbol-common scrambling sequence which is different from LPN to LPN; and a transceiver unit 8030 which transmits the plurality of layers of resource blocks obtained from the scrambling unit 8020 to the at least one UE. It should be noted that RS signals here can be IM-RS signals.

The transmission point device 8000 according to the present disclosure may further include a CPU (Central Processing Unit) 8100 for executing related programs to process various data and control operations of respective units in the transmission point device 8000, a ROM (Read Only Memory) 8130 for storing various programs required for performing various process and control by the CPU 8100, a RAM (Random Access Memory) 8150 for storing intermediate data temporarily produced in the procedure of process and control by the CPU 8100, and/or a storage unit 8170 for storing various programs, data and so on. The above orthogonalizing unit 8010, scrambling unit 8020, transceiver unit 8030, CPU 8100, ROM 8130, RAM 8150 and/or storage unit 8170 etc. may be interconnected via data and/or command bus 8200 and transfer signals between one another.

Respective units as described above do not limit the scope of the present disclosure. According to one embodiment of the disclosure, the function of any of the above orthogonalizing unit 8010, scrambling unit 8020, and transceiver unit 8030 may also be implemented by functional software in combination with the above CPU 8100, ROM 8130, RAM 8150 and/or storage unit 8170 etc.

By the orthogonalizing unit 8010 and the scrambling unit 8020 in the device 8000, multiple layers of IM-RS signals from a macro node and multiple LPNs may be configured as shown in FIGS. 5 and 6. That is, IM-RSs from multiple LPNs are kept fully orthogonal with IM-RS from a macro node and quasi-orthogonal with each other by applying a single scrambling on a macro node and a double scrambling on each of LPNs, so that, when detecting the interference from a LPN, the interference from a macro node can be eliminated thoroughly while the interference from other LPNs can be effectively reduced.

It should be noted that, instead of being in a TP, the device 8000 may be configured in another node which functions as a central node for scrambling multiple RS signals transmitted from multiple TPs. Also, the device 8000 may not include the transceiver unit 8030 when being configured in a TP, instead, transmission of multiple layers of resource blocks is implemented by a transceiver device in the TP. In addition, symbol-specific scrambling on all of layers of RS signals and symbol-common scrambling to the layers of RS signals transmitted from LPNs may be implemented respectively by two separate scrambling units, instead of one scrambling unit 8020.

Figure 9:
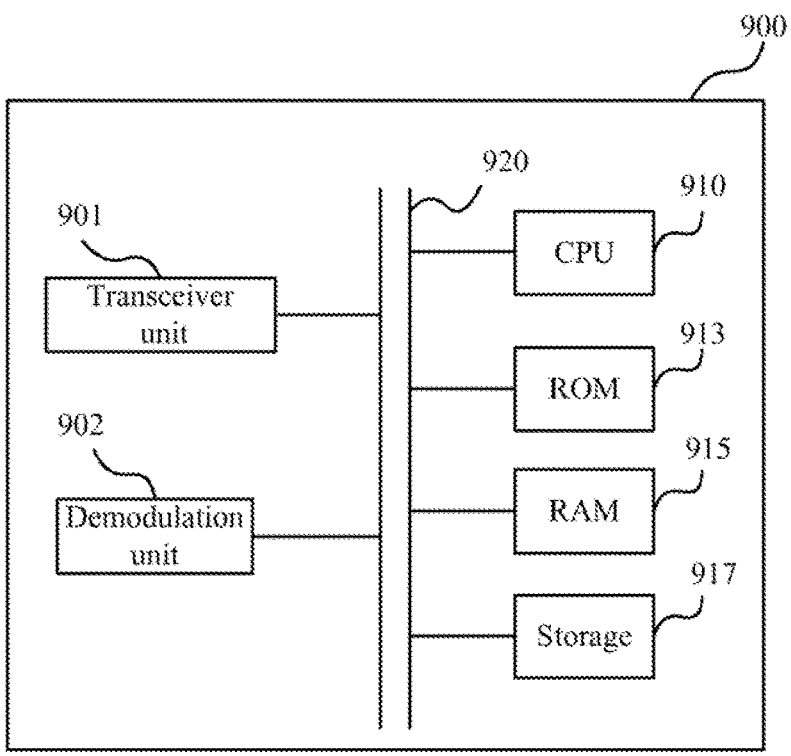
FIG. 9 is a block diagram showing a user equipment (UE) according to the first embodiment of the present disclosure.

FIG. 9 is a block diagram showing user equipment (UE) 900 according to the first embodiment of the present disclosure.

The UE 900 according to the first embodiment of the present disclosure is used for communicating with multiple transmission points including a macro node and multiple LPNs in a communication system. The UE 900 receives from the transmission points a plurality of layers of RS signals assigned on predetermined locations (radio resource, which means the time and/or frequency resource such as sub-carrier, sub-frame, etc.) of a plurality of layers of resource blocks with the same time and frequency resources. As shown in FIG. 9, the UE 900 includes: a transceiver unit 901 which receives the plurality of layers of resource blocks; and a demodulation unit 902 which detects the plurality of layers of resource blocks in time domain and/or frequency domain to obtain the plurality of layers of RS signals, wherein each layer of RS signal transmitted from each transmission point is multiplied by one of a first and a second length-2 orthogonal cover codes (OCCs) wherein the first OCC is multiplied to the layer of RS signal from the macro node while the second OCC is multiplied to layers of RS signals from the multiple LPNs, the two symbols of the OCC multiplied to each layer of RS signal transmitted from each transmission point respectively by different symbol-specific sequences which are common to all layers of RS signals from all of transmission point devices, and the two symbols of the OCC multiplied to the layer of RS signal transmitted from each LPN by a symbol-common scrambling sequence which is different from LPN to LPN. It should be noted that RS signals here can be IM-RS signals.

As described previously with reference to FIGS. 5 and 6, layers of IM-RS signals received by UE 900 from a macro node and multiple LPNs may be configured as shown in FIGS. 5 and 6. That is, IM-RSs from multiple LPNs are kept fully orthogonal with IM-RS from a macro node and quasi-orthogonal with each other by applying a single scrambling on a macro node and a double scrambling on each of LPNs, so that, when detecting the interference from a LPN at UE 900, the interference from a macro node can be eliminated thoroughly while the interference from other LPNs can be effectively reduced.

The UE 900 according to the present disclosure may further include a CPU (Central Processing Unit) 910 for executing related programs to process various data and control operations of respective units in the UE 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above transceiver unit 901, demodulation unit 902, CPU 910, ROM 913, RAM 915 and/or storage unit 917 etc. may be interconnected via data and/or command bus 920 and transfer signals between one another.

Respective units as described above do not limit the scope of the present disclosure. According to one embodiment of the disclosure, the function of any of the above transceiver unit 901 and demodulation unit 902 may also be implemented by functional software in combination with the above CPU 910, ROM 913, RAM 915 and/or storage unit 917 etc.

According to the present embodiment, by applying a single scrambling on a macro node and a double scrambling on each of LPNs, IM-RSs from multiple LPNs can be kept fully orthogonal with IM-RS from a macro node and quasi-orthogonal with each other, so that, when detecting the interference from a LPN, the interference from a macro node can be eliminated thoroughly while the interference from other LPNs can be effectively reduced.

Second Embodiment

In the method of the first embodiment as described above, since a single scrambling is applied on a macro node and a double scrambling is applied on each of LPNs, UE needs to distinguish the macro node and LPNs for the purpose of accurate descrambling. In general, UE does not know which TP is a macro node and which TP is a LPN. Thus, it is preferred to adopt the same scrambling format for a macro node and a LPN. In the present embodiment, it is proposed to apply double scrambling on both LPN and macro node so as to avoid informing UE which transmission point is the macro node.

Figure 10:
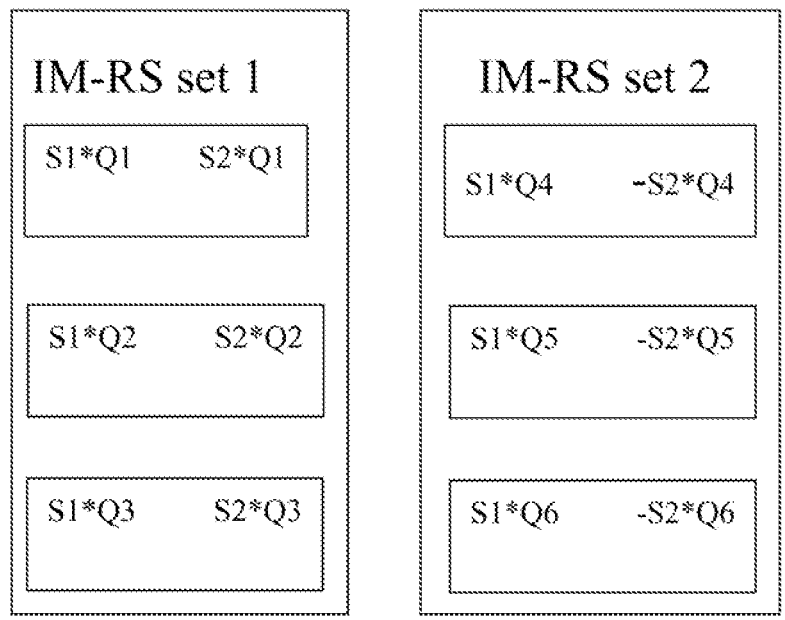
FIG. 10 shows an example of scrambling configuration for IM-RSs from different TPs according to a second embodiment of the present disclosure.

FIG. 10 shows an example of scrambling configuration for IM-RSs from different TPs according to the second embodiment of the present disclosure. As shown in FIG. 10, there are configured two sets of IM-RSs, i.e., IM-RS set 1 and IM-RS set 2. Each IM-RS in the set 1 is assigned with the length-2 OCC [1, 1] while each IM-RS in the set 2 is assigned with the OCC [1, −1]. Thus, by the above OCC configuration, IM-RS ports in the set 1 are fully orthogonal with IM-RS ports in the set 2. Furthermore, for each IM-RS either in the set 1 or in the set 2, the two symbols of OCC are multiplied respectively by two different symbol-specific scrambling sequences which are common to all of IM-RSs in the set 1 and the set 2. In addition, in the set 1 or in the set 2, the two symbols of OCC for each IM-RS are further multiplied by a symbol-common scrambling sequence which is different from IM-RS to IM-RS. By such additional configuration, IM-RS ports in both the set 1 and the set 2 are applied double scrambling, thereby IM-RS ports in the set 1 are quasi-orthogonal with each other while IM-RS ports in the set 2 are quasi-orthogonal with each other.

As for IM-RS configuration for a macro node and LPNs, IM-RSs from multiple LPNs can be kept fully orthogonal with IM-RS from a macro node and quasi-orthogonal with each other as long as IM-RS from the macro node and IM-RSs from the multiple LPNs are configured respectively from different sets, that is, if the OCC and scrambling configuration of IM-RS from the macro node is selected from the IM-RS set 1, the OCC and scrambling configuration of IM-RSs from the multiple LPNs should be selected from the IM-RS set 2, and vice versa.

Figure 11:
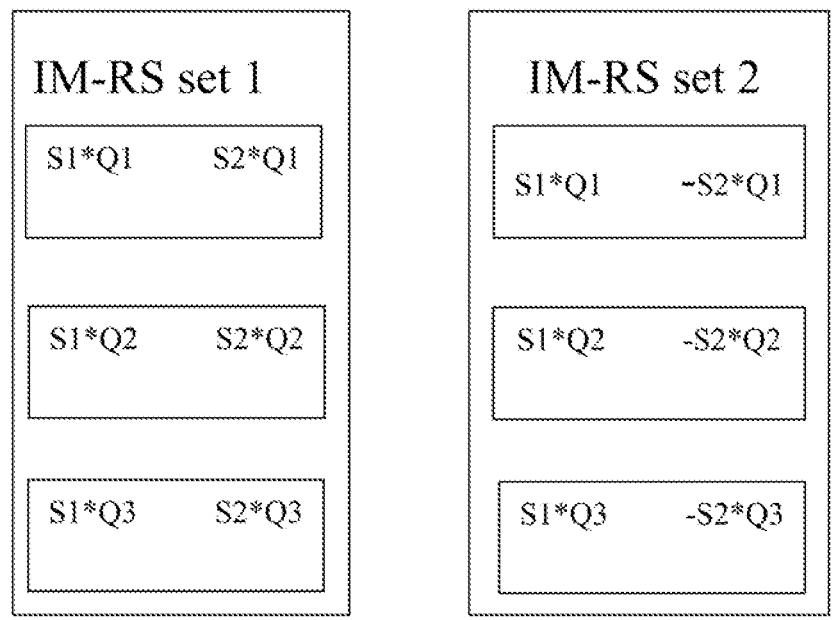
FIG. 11 shows another example of scrambling configuration for IM-RSs from different TPs according to the second embodiment of the present disclosure.

It is noted that, in FIG. 10, IM-RSs in the set 1 are multiplied respectively by symbol-common scrambling sequences Q1, Q2 and Q3 which are different from symbol-common scrambling sequences Q4, Q5 and Q6 multiplied respectively to IM-RSs in the set 2. However, the present disclosure is not limited to this. FIG. 11 shows another example of scrambling configuration for IM-RSs from different TPs according to the second embodiment of the present disclosure.

In FIG. 11, the configuration of OCC and symbol-specific scrambling sequence for the set 1 and the set 2 are the same with that in FIG. 10. Different from FIG. 10, IM-RSs in the set 1 are multiplied respectively by symbol-common scrambling sequences Q1, Q2 and Q3 which are also multiplied respectively to IM-RSs in the set 2. Quasi-orthogonality within respective sets or among IM-RS ports assigned with a same OCC can be obtained as long as IM-RS ports assigned with a same OCC are multiplied by different symbol-common scrambling sequences. Therefore, the symbol-common scrambling sequence may be reused among different sets, that is, among OCCs.

According to the present embodiment, the scrambling unit 8020 in the device 8000 may further multiplies the two symbols of the OCC multiplied to the layer of RS signal transmitted from the macro node by a symbol-common scrambling sequence which can be the same as one of or different from all of the symbol-common scrambling sequences multiplied to the other layers of RS signals transmitted from LPNs. Alternatively, the device 8000 may include another scrambling unit to implement such scrambling function.

According to the present embodiment, in addition to the effects achieved in the first embodiment, by applying double scrambling to both a macro node and LPNs, there is no need to inform UE which transmission point is the macro node.

Third Embodiment

The above two embodiments are both related to length-2 OCCs. However, the present disclosure is not limited to this and may be extended to length-4 OCCs and so on. As an example, the present embodiment is to apply double scrambling to length-4 OCCs. Note that, 4 port CSI-RS is adopted on two adjacent OFDM symbols and two subcarriers that are six subcarriers away on a resource block.

FIG. 12 shows an example of scrambling configuration for IM-RSs from different TPs according to the third embodiment of the present disclosure. FIG. 12 is to extend the concept in the above embodiment to a length-4 OCC case. Specifically, as shown in FIG. 12, IM-RS from a macro node is assigned with a length-4 OCC [1, 1, 1, 1], IM-RSs from LPN1 and LPN4 are assigned with a length-4 OCC [1, −1, 1, −1], IM-RSs from LPN2 and LPN5 are assigned with a length-4 OCC [1, 1, −1, −1], and IM-RSs from LPN3 and LPN6 are assigned with a length-4 OCC [1, −1, −1, 1]. Thus, IM-RSs from LPNs are kept fully orthogonal with IM-RS from the macro node since each of IM-RSs from LPNs is assigned with a different length-4 OCC from that for the macro node. Furthermore, for each of the macro node and the six LPNs, four symbols of the assigned length-4 OCC are multiplied respectively by four different symbol-specific scrambling sequences which can be common to all of IM-RSs from the macro node and LPNs. Then, for each of the macro node and the six LPNs, four symbols of the assigned length-4 OCC are additionally multiplied by a symbol-common scrambling sequence. That is, the symbol-common scrambling is common to two OFDM symbols and two subcarriers that are six carriers away on a resource block. The symbol-common sequence may be common among different OCCs but should be allowed to be different between LPNs assigned with a same OCC.

Specifically, as shown in FIG. 12, the macro node and LPN1 to LPN3 are multiplied by a same symbol-common sequence Q1 since they are assigned with different OCCs. LPN4 is multiplied by a symbol-common scrambling sequence Q2 different from the symbol-common sequence Q1 multiplied to LPN1 since they are assigned with a same OCC [1, −1, 1, −1]. Also, LPN5 is multiplied by a symbol-common scrambling sequence Q2 different from the symbol-common sequence Q1 multiplied to LPN2 since they are assigned with a same OCC [1, 1, −1, −1]. The same is true for LPN3 and LPN6. Similarly, LPN4 to LPN6 are multiplied by a same symbol-common sequence Q2 since they are assigned with different OCCs. It is noted that, the configuration shown in FIG. 12 is only illustrative and the present disclosure is not limited to it. Obviously, LPN1 to LPN3 may be multiplied by the symbol-common sequence Q2 while LPN4 to LPN6 are multiplied by symbol-common sequence Q1.

In this situation, by using length-4 OCC to the macro node and six LPNs, not only the interference from the macro node but also the interference from some LPNs is eliminated thoroughly. Taking LPN1 as an example, it is interfered by LPN4 only since they are assigned with a same OCC. By the application of different symbol-common sequences, the interference from LPN4 can be reduced. On the other hand, since LPN1 is fully orthogonal with not only the macro node but also LPN2, LPN3, LPN5 and LPN6, the interference from both the macro node and the four LPNs is removed very well.

It is noted that length-4 OCC is only an example and the length of OCC is not limited to 2 or 4. The present disclosure may be extended to OCC with an even longer length.

According to the present embodiment, by using length-4 OCC and double scrambling to both the macro node and LPNs, the interference from other LPNs are further eliminated.

Fourth Embodiment

In the above embodiments, symbol-specific scrambling sequences are firstly used to all of the macro node and LPNs and then symbol-common scrambling sequences are further used to only LPNs or all of the macro node and LPNs. However, the present disclosure is not limited to this. The order of application of symbol-specific scrambling sequences and symbol-common scrambling sequences is not fixed and may be reversed. That is, symbol-common scrambling sequences may be applied before symbol-specific scrambling sequences.

Furthermore, it is also possible to use symbol-common scrambling sequences only without applying symbol-specific scrambling sequences. By configuration of OCC and symbol-specific scrambling sequences only, the present disclosure can achieve the same effects as the above embodiments. Specifically, the full orthogonality between the macro node and LPNs can be obtained by OCC configuration while quasi-orthogonality among LPNs can be obtained by symbol-specific scrambling.

According to the present embodiment, the orthogonalizing unit 8010 may multiply each layer of reference signal selectively by one of a plurality of OCCs with the same length, wherein the OCC multiplied to a first layer of reference signal transmitted from for example a first transmission point can be configured as different from those multiplied to other layers of reference signals transmitted from for example other transmission points, and the scrambling unit 8020 may multiply all of symbols obtained from the OCC multiplied to each of the other layers of reference signals by a symbol-common scrambling sequence, wherein the symbol-common scrambling sequences can be different from each other for reference signals multiplied by the same OCC.

In addition, although the present disclosure has been described taking one macro node as an example, the number of macro nodes is not limited to one and there may be several macro nodes in a communication system. The present disclosure is also applicable to a case in which there are multiple macro nodes and multiple LPNs. For example, it is only needed to achieve full orthogonality between macro nodes and LPNs by OCC configuration and to obtain quasi-orthogonality respectively among macro nodes and among LPNs by symbol-common scrambling.

According to the present embodiment, the orthogonalizing unit 8010 may multiply each layer of reference signal, being grouped into two sets with a first set being transmitted from for example a first group of transmission points and a second set being transmitted from for example a second group of transmission points, selectively by one of a plurality of OCCs with the same length, wherein the OCCs multiplied to the first set can be configured as different from those multiplied to the second set, and the scrambling unit 8020 may multiply all of symbols of obtained from the OCC multiplied to each layer of reference signal by a symbol-common scrambling sequence, wherein the symbol-common scrambling sequences can be different from each other for reference signals multiplied by the same OCC.

The following is to realize the idea of the present disclosure in 3GPP specifications TS 36.211. It is proposed to make some changes to the current specifications as follows. As an example, the following definition of the present embodiment corresponds to the case of the second embodiment where no signaling is needed to indicate UE of "macro node" and "LPN" and length-2 OCCs are assumed.

The symbol-specific scrambling sequence $r_{l,n_s}(m)$ is defined by $$r_{l,n_s}(m) = \frac{1}{\sqrt{2}}(1 - 2 \cdot c(2m)) + j\frac{1}{\sqrt{2}}(1 - 2 \cdot c(2m+1)), \quad (7)$$

$$m = 0, 1, \ldots, N_{RB}^{max,DL} - 1$$

where $n_s$ is the slot number within a radio frame and l is the OFDM symbol number within the slot. The pseudo-random sequence c(i) is defined in Section 7.2 of 3GPP TS 36.211 V10.4.0. The pseudo-random sequence generator shall be initialized with $$c_{init} = 2^{10} \cdot (7 \cdot (n_s+1)+l+1) \cdot (2 \cdot N_{ID}^{CSIRS}+2 \cdot N_{ID}^{CSIRS}+N_{CP} \quad (8)$$

at the start of each OFDM symbol where $N_{ID}^{CSIRS}$ indicates CSI-RS ID and $$N_{CP} = \begin{cases} 1 & \text{for } normalCP \\ 0 & \text{for } extendedCP \end{cases}$$

The symbol-common scrambling sequence $r'_{l,n_s}(m)$ is defined by $$r'_{l,n_s}(m) = \frac{1}{\sqrt{2}}(1 - 2 \cdot c(2m)) + j\frac{1}{\sqrt{2}}(1 - 2 \cdot c(2m+1)), \quad (9)$$

$$m = 0, 1, \ldots, N_{RB}^{max,DL} - 1$$

where $n_s$ is the slot number within a radio frame and l is the OFDM symbol number within the slot. The pseudo-random sequence c(i) is defined in Section 7.2 of 3GPP TS 36.211 V10.4.0. The pseudo-random sequence generator shall be initialized with $$c_{init} = 2^{10} \cdot (7 \cdot (n_s+1)+l+1) \cdot (2 \cdot N_{ID}^{IMRS}+1)+ \\ 2 \cdot N_{ID}^{IMRS}+N_{CP} \quad (10)$$

at the start of each OFDM symbol where $N_{ID}^{IMRS}$ indicates IM-RS ID and $$N_{CP} = \begin{cases} 1 & \text{for } normalCP \\ 0 & \text{for } extendedCP \end{cases}$$

As compared with the definition of CSI reference-signal sequence for example in section 6.10.5 in 3GPP TS 36.211 V10.4.0, the symbol-specific scrambling sequence $r_{l,n_s}(m)$ in the present disclosure is the same as CSI reference-signal sequence defined in 3GPP TS 36.211. The random seed generation equation (8) is the same as that defined in 3GPP TS 36.211 only except that the parameter $N_{ID}^{cell}$ is replaced by $N_{ID}^{CSIRS}$. In 3GPP TS 36.211, the random seed for CSI reference-signal sequence is based on cell ID. In the present disclosure, $N_{ID}^{CSIRS}$ is not limited to cell ID and may be other IDs which may be signaled by the higher layer. For example, returning back to FIGS. 10 and 11, two different symbol-specific scrambling sequences S1 and S2 are generated from the above equation (7) and (8) and are based on different $N_{ID}^{CSIRS}$.

In view of generation equation and random seed generation equation, the symbol-common scrambling sequence $r'_{l,n_s}(m)$ defined in the present disclosure is similar with the symbol-specific scrambling sequence $r_{l,n_s}(m)$, the difference between them is that they are based on different IDs, that is, the former is based on $N_{ID}^{IMRS}$ and the latter is based on $N_{ID}^{CSIRS}$. Taking FIG. 10 and FIG. 11 as an example, different symbol-common scrambling sequences Q1-06 are generated from the above equation (9) and (10) and are based on different $N_{ID}^{IMRS}$ which may be also signaled by the higher layer.

The above definition is applicable for both CoMP scenarios 3 and 4. Specifically, for scenario 3, the random seed for the symbol-common scrambling sequence can be based on cell ID. On the other hand, for scenario 4, the random seed for the symbol-common scrambling sequence can be based on CSI-RS ID or IM-RS ID signaled by the higher layer. It is noted that the CSI-RS ID may be also used in CSI-RS scrambling.

In such case, with respect to DL (downlink) signaling, three scrambling random seeds and related OCC are signaled or to be specified for each IM-RS port. Specifically, two different random seeds are for two symbol-specific scrambling sequences for different OFDM symbols, another random seed is for the symbol-common scrambling sequence which is common across OFDM symbols, and one bit is for the OCC.

According to the present embodiment, in subframes configured for IM-RS transmission, the symbol-specific scrambling sequence $r_{l,n_s}(m)$ and the symbol-common scrambling sequence $r'_n$ (in) shall be mapped to complex-valued modulation symbols $a_{k,l}^{(p)}$ used as reference symbols on antenna port p according to $$a_{k,l}^{(p)} = w_{l''} \cdot r_{l,n_s}(m') \cdot r'_{l',n_s}(m') \quad (11)$$

where $$k = k' + 12m + \begin{cases} -0 \text{ for } p \in \{15, 16\}, \text{ normal cyclic prefix} \\ -6 \text{ for } p \in \{17, 18\}, \text{ normal cyclic prefix} \\ -1 \text{ for } p \in \{19, 20\}, \text{ normal cyclic prefix} \\ -7 \text{ for } p \in \{21, 22\}, \text{ normal cyclic prefix} \\ -0 \text{ for } p \in \{15, 16\}, \text{ extended cyclic prefix} \\ -3 \text{ for } p \in \{17, 18\}, \text{ extended cyclic prefix} \\ -6 \text{ for } p \in \{19, 20\}, \text{ extended cyclic prefix} \\ -9 \text{ for } p \in \{21, 22\}, \text{ extended cyclic prefix} \end{cases}$$

$$l = l' + \begin{cases} l'' & \text{CSI referencesignal configurations } 0-19, \text{ normal cyclic prefix} \\ 2l'' & \text{CSI referencesignal configurations } 20-31, \text{ normal cyclic prefix} \\ l'' & \text{CSI referencesignal configurations } 0-27, \text{ extended cyclic prefix} \end{cases}$$

$$w_{l''} = \begin{cases} 1 & \text{if } \mod(N_D^{IMRS}, 2) = 0 \\ (-1)^{l''} & \text{if } \mod(N_D^{IMRS}, 2) = 1 \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

and the quantity (k',l') and the necessary conditions on $n_s$ are given by Tables 6.10.5.2-1 and 6.10.5.2-2 in 3GPP TS 36.211 V10.4.0 for normal and extended cyclic prefix respectively.

The difference of the equation (11) from that in 3GPP TS 36.211 is the additional multiplication by $r'_{l',n_s}(m')$ in which the subscript l' is to have the symbol-common scrambling sequence. The definition of parameters k, l, l″, in and m' are the same as those in 3GPP TS 36.211 while the parameter $w_{l''}$ is different. The parameter $w_{l''}$ indicates that the OCC is based on $N_{ID}^{IMRS}$ in the present embodiment. However, it is only one possible design and OCC may be configured by the higher layer. In addition, for the parameter k, the designation of antenna port p, such as 15, 16, 17, 18, 19, 20, 21, 22, may be changed if a new port needs to be defined as required by the communication system.

CSI-RS defined in Rel-10 is for channel estimation rather than interference. Instead of defining additional pilots dedicated for interference measurement, the present disclosure can reuse one or more of the CSI-RS configurations for this purpose with minor modifications, for example based on the above definition. For example, in Rel-10, support of up to 40 CSI-RS ports is possible (normal CP (cyclic prefix), 2Tx (transmitter)) by the exhaustive list of CSI-RS port combinations. In a single cell transmission, only up to 8 CSI-RS ports are needed to support 8 Tx antennas and the rest is to support additional reuse if needed.

It is noted that, when only symbol-common scrambling is performed as described in the fourth embodiment, the equation (11) can be simplified as $$a_{k,l}^{(p)} = w_{l''} \cdot r'_{l',n_s}(m') \quad (12)$$

According to the present embodiment, based on the minor modification to 3GPP specifications TS 36.211, the interference measurement mechanism of the present disclosure is easy to implement.

Fifth Embodiment

Figure 13:
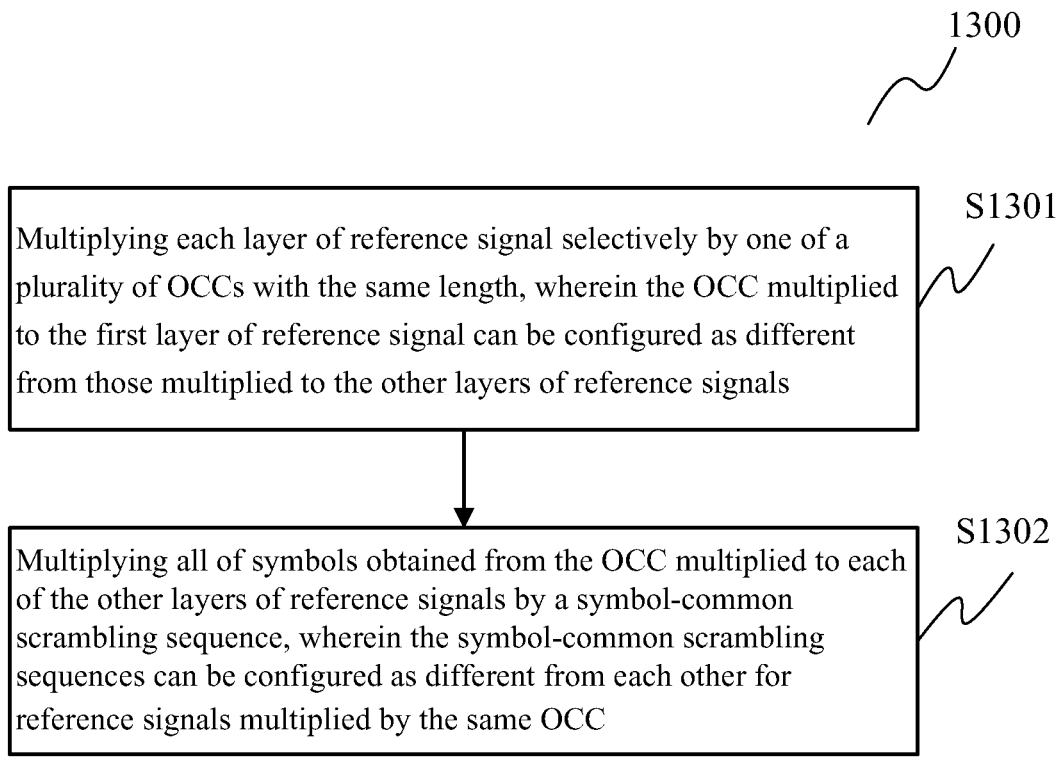

FIG. 13 is a diagram showing a flow chart of a method of scrambling reference signals according to the fifth embodiment of the present disclosure.

As shown in FIG. 13, the method 1300 according to the fifth embodiment of the present disclosure is used for scrambling a plurality of layers of reference signals assigned on predetermined radio resource of a plurality of layers of resource blocks with the same time and frequency resources, wherein a first layer of reference signal may be for example transmitted from a first transmission point and other layers may be for example transmitted from other transmission points. In the step 1301, each layer of reference signal is multiplied selectively by one of a plurality of orthogonal cover codes (OCCs) with the same length, wherein the OCC multiplied to the first layer of reference signal can be configured as different from those multiplied to the other layers of reference signals. In the step 1302, all of symbols obtained from the OCC multiplied to each of the other layers of reference signals are multiplied by a symbol-common scrambling sequence, wherein the symbol-common scrambling sequences can be different from each other for reference signals multiplied by the same OCC.

According to the present embodiment, the above step S1301 can be executed by the orthogonalizing unit 8010, and the above steps S1302 can be executed by the scrambling unit 8020.

According to the present embodiment, the symbol-common scrambling sequence is expressed as $r'_{l,n_s}$ (in) which is defined by the equation (9) and its pseudo-random sequence generator is initialized with the equation (10) at the start of each OFDM symbol.

According to the present embodiment, the symbol-common scrambling sequence $r'_{l,n_s}(m)$ is mapped to complex-valued modulation symbols $a_{k,l}^{(p)}$ used as reference symbols on antenna port p according to the equation (12).

According to the present embodiment, although not shown in FIG. 13, the method 1300 may further include a second scrambling step of multiplying all of symbols obtained from the OCC multiplied to each layer of reference signal respectively by different symbol-specific scrambling sequences which can be configured as common to all of the plurality of layers of reference signals. This step may also be executed by the scrambling unit 8020 or may be executed by another scrambling unit (not shown in FIG. 8) in the device 8000.

According to the present embodiment, the symbol-specific scrambling sequence is expressed as $r_{l,n_s}(m)$ which is defined by the equation (7) and its pseudo-random sequence generator is initialized with the equation (8) at the start of each OFDM symbol.

According to the present embodiment, the symbol-specific scrambling sequence $r_{l,n_s}(m)$ and the symbol-common scrambling sequence $r'_{l,n_s}(m)$ are mapped to complex-valued modulation symbols $a_{k,l}^{(p)}$ used as reference symbols on antenna port p according to the equation (11).

According to the present embodiment, although not shown in FIG. 13, the method 1300 may further include a third scrambling step of multiplying all of symbols obtained from the OCC multiplied to the first layer of reference signal by another symbol-common scrambling sequence which is the same as one of or different from all of the symbol-common scrambling sequences multiplied to the other layers of reference signals. This step may also be executed by the scrambling unit 8020 or may be executed by a further scrambling unit (not shown in FIG. 8) in the device 8000.

According to the present embodiment, the random seeds for the symbol-common sequences are based on cell ID or CSI-RS ID or IM-RS ID.

According to the present embodiment, random seeds for the symbol-specific sequences and the symbol-common sequences and the OCCs are signaled to user equipment or to be specified for each port.

According to the present embodiment, the reference signals are interference measurement reference signals.

According to the present embodiment, by the configuration of OCC and scrambling on IM-RSs, IM-RSs from multiple LPNs are kept fully orthogonal with IM-RS from a macro node and quasi-orthogonal with each other, so that, when detecting the interference from a LPN, the interference from a macro node can be eliminated thoroughly while the interference from other LPNs can be effectively reduced.

Sixth Embodiment

Figure 14:
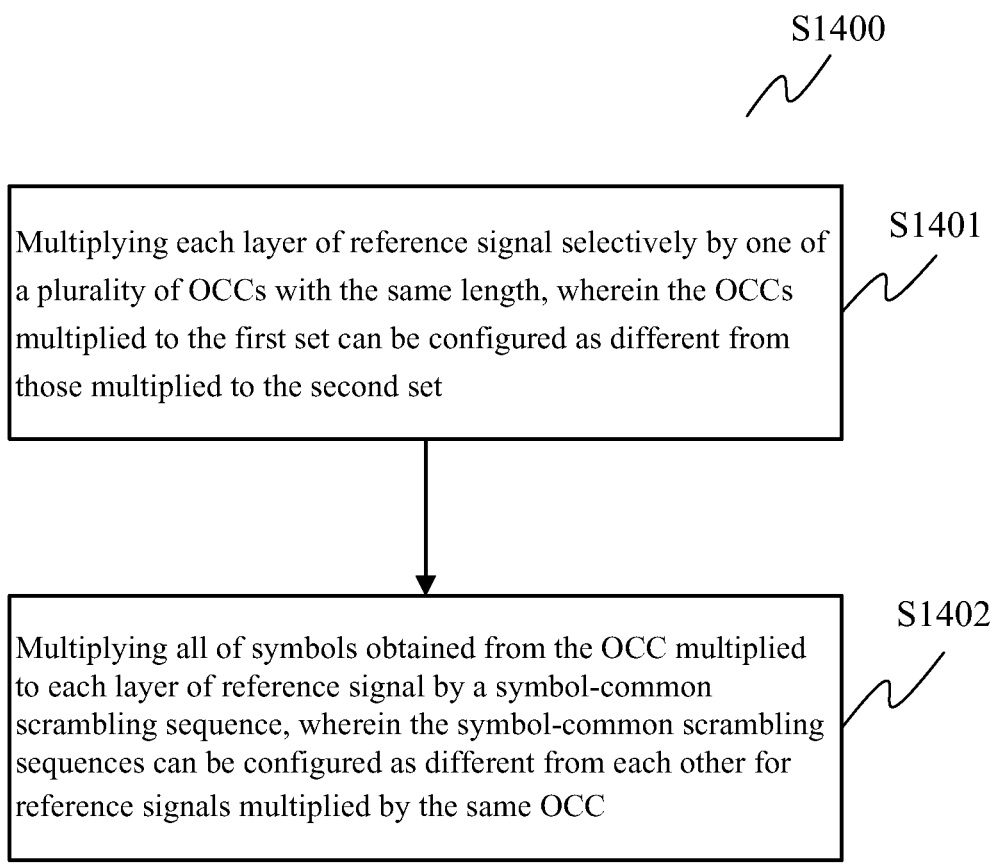
FIG. 14 is a diagram showing a flow chart of a method of scrambling reference signals according to a sixth embodiment of the present disclosure.

FIG. 14 is a diagram showing a flow chart of a method of scrambling reference signals according to the sixth embodiment of the present disclosure.

As shown in FIG. 14, the method 1400 according to the present embodiment is used for scrambling a plurality of layers of reference signals assigned on predetermined radio resource of a plurality of layers of resource blocks with the same time and frequency resources, wherein the plurality of layers of reference signals may be grouped into two sets in which a first set may be for example transmitted from a first group of transmission points and a second set may be for example transmitted from a second group of transmission points. In the step S1401, each layer of reference signal is multiplied selectively by one of a plurality of orthogonal cover codes (OCCs) with the same length, wherein the OCCs multiplied to the first set can be configured as different from those multiplied to the second set. In the step S1402, all of symbols obtained from the OCC multiplied to each layer of reference signal are multiplied by a symbol-common scrambling sequence, wherein the symbol-common scrambling sequences can be different from each other for reference signals multiplied by the same OCC.

According to the present embodiment, the above step S1401 can be executed by the orthogonalizing unit 8010, and the above steps S1402 can be executed by the scrambling unit 8020.

According to the present embodiment, the symbol-common scrambling sequence is expressed as $r'_{l,n_s}(in)$ which is defined by the equation (9) and its pseudo-random sequence generator is initialized with the equation (10) at the start of each OFDM symbol.

According to the present embodiment, the symbol-common scrambling sequence $r'_{l'',n_s}(m)$ is mapped to complex-valued modulation symbols $a_{k,l}^{(p)}$ used as reference symbols on antenna port p according to the equation (12).

According to the present embodiment, although not shown in FIG. 14, the method 1400 may further include a second scrambling step of multiplying all of symbols obtained from the OCC multiplied to each layer of reference signal respectively by different symbol-specific scrambling sequences which can be configured as common to all of the plurality of layers of reference signals. This step may also be executed by the scrambling unit 8020 or may be executed by another scrambling unit (not shown in FIG. 8) in the device 8000.

According to the present embodiment, the symbol-specific scrambling sequence is expressed as $r_{l,n_s}(m)$ which is defined by the equation (7) and its pseudo-random sequence generator is initialized with the equation (8) at the start of each OFDM symbol.

According to the present embodiment, the symbol-specific scrambling sequence $r_{l,n_s}(m)$ and the symbol-common scrambling sequence $r'_{l,n_s}(m)$ are mapped to complex-valued modulation symbols $a_{k,l}^{(p)}$ used as reference symbols on antenna port p according to the equation (11).

According to the present embodiment, the random seeds for the symbol-common sequences are based on cell ID or CSI-RS ID or IM-RS ID.

According to the present embodiment, random seeds for the symbol-common sequences and the symbol-specific sequences and the OCCs are signaled to user equipment or to be specified for each port.

According to the present embodiment, the reference signals are interference measurement reference signals.

According to the present embodiment, by the configuration of OCC and scrambling on IM-RSs, IM-RSs from multiple LPNs are kept fully orthogonal with IM-RSs from multiple macro nodes and quasi-orthogonality is obtained among the multiple LPNs and among multiple macro nodes, so that, when detecting the interference from a LPN, the interference from a macro node can be eliminated thoroughly while the interference from other LPNs can be effectively reduced.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A user equipment comprising:
a receiver, which, in operation, receives a plurality of channel state information-reference signals (CSI-RSs) based on one or more CSI-RS configurations; and
circuitry, which, in operation, calculates a channel quality indicator (CQI) based on the plurality of CSI-RSs,
wherein two or more CSI-RS configurations are used for more than eight CSI-RS ports, and
wherein sequences of the plurality of CSI-RSs are generated by using a CSI-RS ID which is indicated by a higher layer signaling and which is different from a cell ID.

2. The user equipment according to claim 1, wherein each CSI-RS transmitted using each CSI-RS port among the plurality of CSI-RSs is multiplied with one of a plurality of orthogonal sequences having a length of four.

3. The user equipment according to claim 1, wherein each CSI-RS transmitted using each CSI-RS port among the plurality of CSI-RSs is multiplied with one of a plurality of orthogonal sequences having a length of four and is mapped to two orthogonal frequency-division multiplexing (OFDM) symbols and to two subcarriers.

4. The user equipment according to claim 3, wherein the two OFDM symbols are two consecutive OFDM symbol.

5. The user equipment according to claim 3, wherein the two subcarriers are six subcarriers apart from each other in a frequency domain.

6. The user equipment according to claim 1, wherein the plurality of CSI-RSs are received from a plurality of transmission points which include a macro node and one or more low power nodes (LPNs).

7. The user equipment according to claim 2, wherein the plurality of orthogonal sequences having the length of four include [1, 1, 1, 1], [1, −1, 1, −1], [1, 1, −1, −1] and [1, −1, −1, 1].

8. A communication method comprising:
receiving a plurality of channel state information-reference signals (CSI-RSs) based on one or more CSI-RS configurations; and
calculating a channel quality indicator (CQI) based on the plurality of CSI-RSs,
wherein two or more CSI-RS configurations are used for more than eight CSI-RS ports, and
wherein sequences of the plurality of CSI-RSs are generated by using a CSI-RS ID which is indicated by a higher layer signaling and which is different from a cell ID.

9. The communication method according to claim 8, wherein each CSI-RS transmitted using each CSI-RS port among the plurality of CSI-RSs is multiplied with one of a plurality of orthogonal sequences having a length of four.

10. The communication method according to claim 8, wherein each CSI-RS transmitted using each CSI-RS port among the plurality of CSI-RSs is multiplied with one of a plurality of orthogonal sequences having a length of four, and is mapped to two orthogonal frequency-division multiplexing (OFDM) symbols and to two subcarriers.

11. The communication method according to claim 10, wherein the two OFDM symbols are two consecutive OFDM symbol.

12. The communication method according to claim 10, wherein the two subcarriers are six subcarriers apart from each other in a frequency domain.

13. The communication method according to claim 8, wherein the plurality of CSI-RSs are received from a plurality of transmission points which include a macro node and one or more low power nodes (LPNs).

14. The communication method according to claim 9, wherein the plurality of orthogonal sequences having the length of four include [1, 1, 1, 1], [1, −1, 1, −1], [1, 1, −1, −1] and [1, −1, −1, 1].

15. The user equipment according to claim 1, wherein the sequences of the plurality of CSI-RSs are generated using:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1,$$

where $n_s$ is a slot number within a radio frame, l is an OFDM symbol number within a slot, c(i) is pseudo-random sequence and m is an integer between 0 and $N_{RB}^{max,DL}-1$.

16. The user equipment according to claim 1, wherein a pseudo-random sequence generator is initialized based on the CSI-RS ID.

17. The communication method according to claim 8, wherein the sequences of the plurality of CSI-RSs are generated using:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, N_{RB}^{max,DL} - 1,$$

where $n_s$ is a slot number within a radio frame, l is an OFDM symbol number within a slot, c(i) is pseudo-random sequence and m is an integer between 0 and $N_{RB}^{max,DL} - 1$.

18. The communication method according to claim 8, wherein a pseudo-random sequence generator is initialized based on the CSI-RS ID.

* * * * *